United States Patent [19]

Lowther

[11] 3,970,567

[45] July 20, 1976

[54] OZONIZER WITH ABSORPTION OF OZONE

[75] Inventor: Frank Eugene Lowther, Severna Park, Md.

[73] Assignee: W. R. Grace & Co., Columbia, Md.

[22] Filed: Apr. 17, 1975

[21] Appl. No.: 568,934

[52] U.S. Cl. ................................. 250/533; 204/176
[51] Int. Cl.² ........................................ C01B 13/11
[58] Field of Search ................... 250/533, 540–541; 204/176

[56] References Cited
UNITED STATES PATENTS

| | | |
|---|---|---|
| 1,757,477 | 5/1930 | Rosenhoch ................... 250/533 X |
| 2,271,895 | 2/1942 | Hartman ........................... 250/533 |
| 2,872,397 | 2/1959 | Kiffer ................................. 204/176 |
| 3,654,126 | 4/1972 | McNabney et al. ............... 250/533 |
| 3,663,418 | 5/1972 | Kawahata .......................... 250/533 |
| 3,734,846 | 5/1973 | McNabney et al. ............... 204/176 |

Primary Examiner—John H. Mack
Assistant Examiner—Aaron Weisstuch
Attorney, Agent, or Firm—John C. LeFever

[57] ABSTRACT

An improved ozone generator having at least one dielectric layer between spaced-apart electrodes and having a corona chamber with dielectric solid adsorbent particles disposed in the corona chamber for selectively adsorbing ozone.

6 Claims, 4 Drawing Figures

OZONIZER WITH ABSORPTION OF OZONE

BACKGROUND OF THE INVENTION

This invention relates to the field of ozone synthesis. It presents a new operating process and apparatus for producing ozone from an oxygen-containing gas on a continuous basis, as required for many industrial oxidation demands, such as manufacture of peroxides and organic acids, treatment of municipal sewage and manufacturing wastes, large-scale disinfection and odor control applications, bleaching and treatment of potable water.

While various techniques are known for producing ozone on a laboratory scale, it is generally recognized that electrical corona is most suitable for industrial production of ozone, usually by the "silent electrical discharge" method. Ozone generators operating on this principle generally consist of two electrodes (or a plurality of such electrode sets), at least one of which is covered with a dielectric plate to define a discharge space. The electrodes are connected to a potential which produces an electric current accompanied by a pale bluish-violet light in the discharge space. Oxygen or a gas mixed with oxygen flows through the discharge space, wherein collision with impinging electrons provides the energy necessary for ozone formation. The dielectric acts to distribute and stabilize the discharge, thereby preventing sparking. Conventional ozone production is a function of several variables, including the flow rates of the throughput gases, the magnitude and frequency of the voltage present between plates, and the pressure temperature and composition of the gas.

Electrical efficiency of prior art ozone generators has been low. Since power cost is one of the major expenses in ozone production, any increase in efficiency is significant. Typically, the utilization efficiency of the power input is only about 10 percent; the other 90 percent of the energy is converted to heat, which decomposes ozone and lowers the efficiency. Avoiding ozone decomposition is a major object of this invention.

In ozone generators the heating problem may be overcome partially by water cooling. However, such cooling has only limited effect, because it only provides cooling at a surface, and not within the middle of the discharge space. Also, water cooling is impractical for an ungrounded electrode.

Recovery of freshly-generated ozone from a corona generator can be achieved in several ways. One of the more successful methods employs a selective adsorbent which removes ozone from the exit gas.

An adsorption unit for recovering ozone and recycling oxygen has been described by Kiffer in U.S. Pat. No. 2,872,397. According to this prior art system oxygen is converted into ozone in an electric discharge reactor and the resulting gas mixture containing a major fraction of oxygen and a minor fraction of ozone is passed through a bed of adsorbent particles, such as silica gel. The ozone is adsorbed by silica gel and the remaining oxygen is passed through the bed for recovery and recycle. The recycle stream is replenished continuously or periodically with oxygen in an amount to compensate for that which is converted to ozone product in the generator. Typically, a sufficient number of adsorption units are employed so that when the adsorbent silica gel in one vessel reaches the saturation point for ozone capacity, the ozone containing gas may be switched to other adsorption units. While the ozone-containing oxygen-rich stream from the ozone generator is being treated in the second adsorption unit, the ozone in the first unit is being removed from the adsorbent using a stripping gas such as air, nitrogen or other diluent gas which acts as a carrier for the ozone. This results in a safe ozone-carrier gas mixture suitable for subsequent chemical reaction without explosion hazards inherent in oxygen-ozone mixtures. The adsorption temperatures according to prior art methods may be about −80°C to +20°C. Since the adsorption capacity of silica gel decreases markedly as temperature approaches ambient, refrigerant cooling has been employed to increase the bed capacity. It is also known that the equilibrium of ozone between the adsorbent and gas phase is a function of ozone partial pressure. Accordingly, prior art attempts to employ silica gel adsorbent in ozone synthesis processes has favored high $O_3$ concentration, high pressure and low temperatures.

SUMMARY OF THE INVENTION

An ozone generating system has been found including processes and apparatus for passing an oxygen-containing gas stream through the ozoning process while contacting the gas stream with a solid adsorbent in the ozonizer to adsorb and remove ozone.

The invention includes in its objects the provision of a novel ozone generation and recovery system and operating process, including means for passing oxygen-containing gas through an electrical corona to synthesize ozone while contacting the gas stream with silica gel in situ to adsorb the ozone and recover an oxygen-rich gas stream. The system also provides for recycling the oxygen-containing gas stream in the ozone generating system. Ozone may be recovered by contacting the ozone-laden adsorbent with a carrier gas to desorb ozone to provide ozone product in the carrier gas. A further object is to provide an air separating apparatus having means for separating air into an oxygen-rich gas stream for the source of oxygen feed to the ozone generators and a nitrogen-rich gas stream for desorbing the ozone with nitrogen.

Apparatus and methods have been found for generating and separating ozone which provide a plurality of ozonizers, each comprising spaced-apart metallic electrodes coated with thin dielectric thereby defining a corona chamber; electrical means for imposing a silent discharge potential in the corona chamber; means for maintaining a bed of silica gel adsorbent particles in the corona chamber for adsorbing ozone generated therein; means for passing the oxygen-rich stream through a first ozonizer; means for contacting the gaseous mixture to selectively adsorb ozone while passing oxygen; means for recycling oxygen-containing gas in the first ozonizer; means for desorbing ozone from a second ozonizer simultaneously with operation of the first ozonizer by passing nitrogen-rich gas from the air separation means to obtain a mixed nitrogen-ozone product stream; and means for reversing ozonizer generating and desorbing cycles.

These and other objects and features of the invention will be shown in the following specification and in the drawing.

THE DRAWING

DESCRIPTION OF PREFERRED EMBODIMENTS

In the following description, metric units and parts by weight are employed unless otherwise stated.

Figure 1:
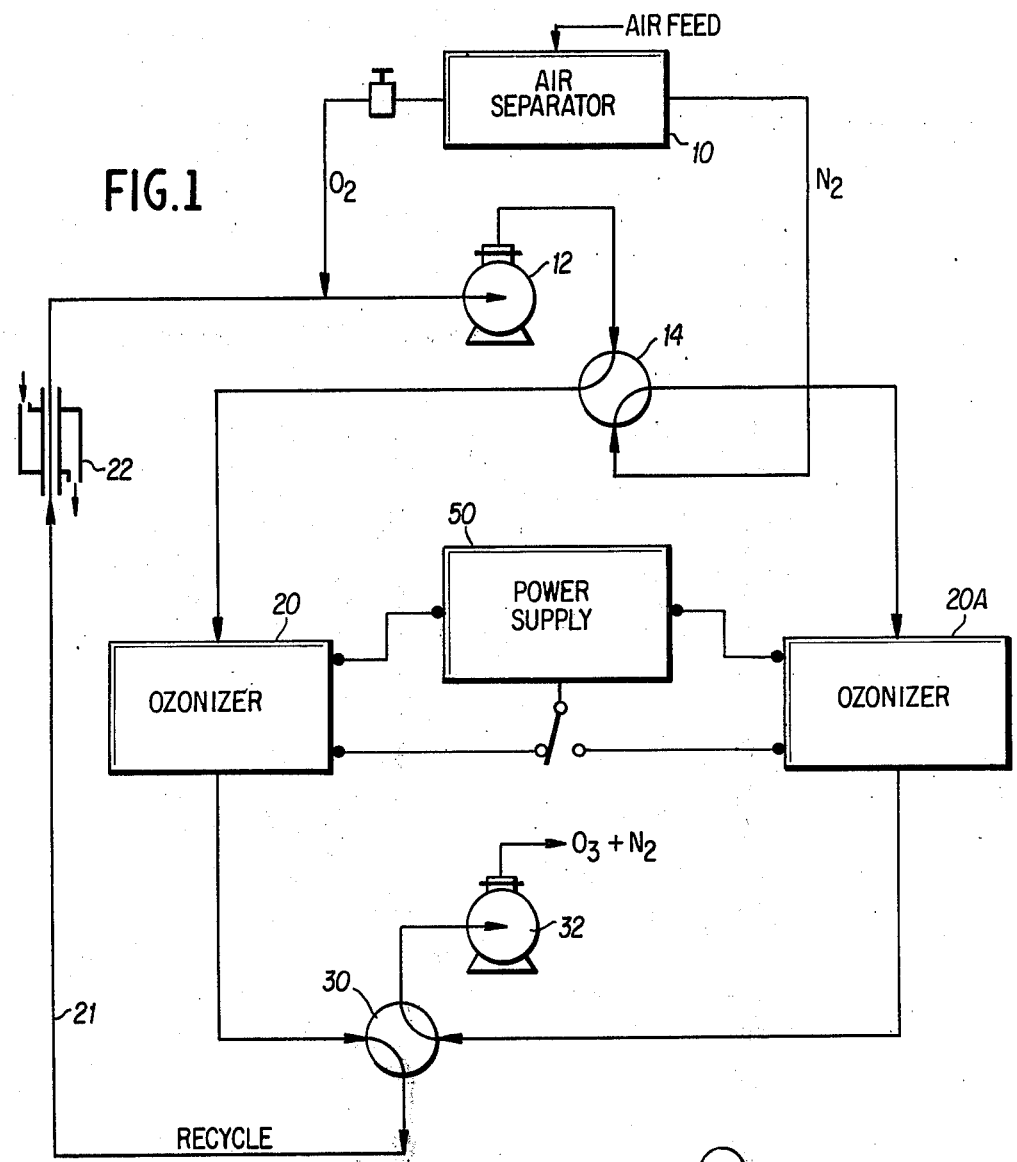
FIG. 1 is a process flow diagram for a typical ozone generation and recovery system according to the present invention.

Referring now to FIG. 1 of the drawing, the process and apparatus are depicted schematically, wherein a feedstream gas consisting essentially of dry air is delivered to an air separation unit 10, where it is separated into an oxygen-rich stream and a nitrogen-rich stream. The separation unit may be run continuously or on demand. The oxygen stream is passed via compressor 12 and four-way valve 14 through a first ozone generator system 20 to produce an ozone-containing oxygen gas, which is contacted in situ with a selective adsorbent to remove the ozone. Oxygen is recycled from the ozonizer unit 20 through recycle conduit 21, cooler 22 to the compressor 12 to obtain an economical process. The ozone-laden adsorbent may be regenerated by passing a carrier gas, such as nitrogen or dry air, through a second static bed ozonizer 20A while the first ozonizer 20 is being used in the generating-adsorbing cycle. The preferred method of operating the recovery system employs dry nitrogen-rich gas from the air separator as the carrier gas by passing the carrier gas through valve 14. The product ozone is then recovered in the carrier gas stream. Nitrogen from the air separation unit 10 is directed to recover adsorbed ozone from ozonizer unit 20A as a product gas consisting essentially of dry nitrogen with a minor amount of ozone. Ozone is stripped from the ozonizer containing silica gel by nitrogen and recovered by passing through 4-way valve 30 and to the low pressure inlet side of compressor pump 32 in the downstream product conduit.

The system is easily reversed by operation of the valves 14 and 30 simultaneously to redirect the gas streams. The feed gas is passed then through valve 14, second ozonizer 20A and compressor 12. Oxygen is again recycled through conduit 21, heat exchanger 22, and compressor 12 through the ozone generation loop. The reverse operation of the remaining part of the generatng and recovery system is an analogous to the first cycle previously described.

Figure 2:
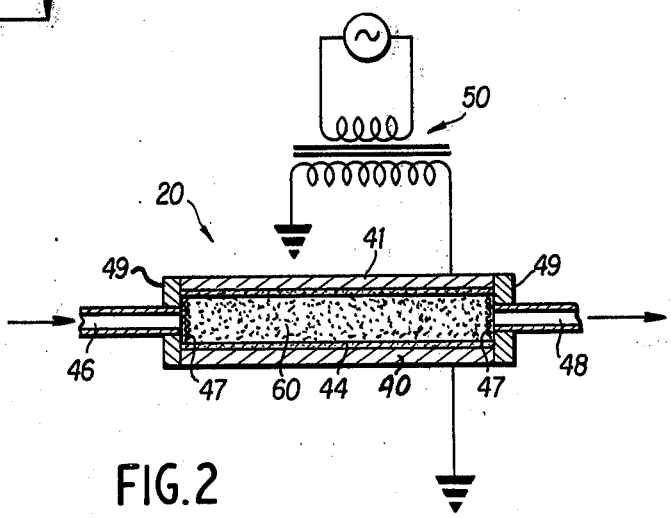
FIG. 2 is a vertical cross section view of a novel static bed ozonizer.

Referring to FIG. 2, an ozone generator 20 is shown comprising a plurality of spaced-apart metallic electrodes 40, 41, each having a thin dielectric layer 44, which are covered at opposing edges by end members 49 thereby defining a corona chamber. Power supply 50 provides electrical means for imposing a silent discharge potential in the corona chamber. The ozonizer is operatively connected to the oxygen gas supply via conduit 46 which provides means for passing the oxygen-containing feedgas through the corona chamber and out through conduit 48. End screens 47 provide means for maintaining a bed of silica gel-adsorbent particles 60 in the corona chamber for adsorbing ozone generated. By confining the particles in the corona chamber between ports for inlet and outlet of the gas stream, a static bed is maintained.

In the preferred embodiments, the ozone generator has a thin dielectric layer on each interior electrode surface defining a corona chamber. Dielectric silica gel particles disposed in the corona chamber for adsorbing ozone may be abrasive. Therefore, choice of a hard and durable dielectric lining may be important. Corona discharge devices are operable with only a single continuous dielectric separating the electrodes; however, practical designs usually employ dual dielectric layers at each electrode.

The recycle stream may be treated continuously or intermittently to remove deleterious impurities or unwanted inert gas to improve the ozone generating efficiency and protect purity. For this purpose a bed of a crystalline aluminosilicate molecular sieve or other gas separating medium may be employed as part of an auxiliary unit disposed in the recycle conduit.

It is well known in the ozoning art that water has deleterious effects on yield and electrical efficiency. The system may be equipped with a pre-drier to remove undesired water prior to the air separation step, or as a part of the air separation unit. Dry gas having a dewpoint below about $-45°C$ is required for optimum operation of an ozone generator. A silica gel, aluminosilicate zeolite, or other drying medium may be employed for this purpose. In addition to predrying the air feed-stream or as an alternative method, one or more sub-loops may be designed into the oxygen recycle to treat the recycle gas for removal of water or other deleterious impurities.

Separation of air into its main $O_2$ and $N_2$ components is well known. Air separation systems such as pressure swing molecular sieve adsorption beds or cryogenic liquefaction may be employed as part of the present inventive concept. Cryogenic processes based on the Joule-Thompson effect are available. The modified Linde-Fränkl cycle is used in numerous industrial gas plants. Typical processes are described in U.S. Pat. Nos. 2,431,866, 2,856,756 and in McClintock's treatise "Cryogenics", Reinhold Publ., 1964. The output streams usually consist essentially of $O_2$ or $N_2$ gas, each being at least 90 vol.% of their respective streams.

The oxygen-rich stream and nitrogen carrier gas can also be provided by other types of air separators. In recent years considerable effort has been expended in developing a selective adsorption unit known as a pressure swing system. Taking advantage of the preferential adsorption of nitrogen gas from air, there systems use reduced pressure to alter the equilibrium conditions to recover the adsorbed nitrogen. Typical pressure swing air separating devices are described in U.S. Pat. Nos. 3,564,816, 3,717,974 and 3,738,087, incorporated herein by reference.

A high gas throughput corona generator suitable for the present system is described in U.S. Pat. No. 3,798,457, incorporated herein by reference. Ozonizers of this type are operable at a high rate of oxygen gas throughput. For instance, a parallel flat plate generator may be operated at high throughput to produce ozone economically at a power input of about 16 $Kw/m^2$. At input pressure of about 1–2 atmospheres, ozone is produced in the desired concentration with an inlet temperature of about 20°C and outlet temperature of about 90°C. Cooling of the ozonized stream is advantageous before the adsorption step. The ozone-containing oxygen stream is maintained at a low temperature, preferably below about 100°C. As compared to typical water-cooled generators, the air cooled units provide high electrical space efficiency, usually about 15 to 50 Kw/m$^2$ electrode area.

Exit gas leaving the corona generator usually has a temperature of about 50° to 100°C, and may be cooled to about ambient temperature (e. g., 0° to 35°C) before recycle to prevent heat build-up. Heat exchangers of the fintube type may be employed between ozonizing stages and at the end to cool the oxygen-rich gas stream for more efficient adsorption by silica gel. Ambient air can be used as the cooling medium for gas-to-gas heat exchange. Other suitable cooling units, such as water-cooled shell and tube, are also suitable for use in the present system.

The ozone generator units may be operated under wide variations in power conditions. High throughput corona devices are available which operate at relatively high power density, typically at 15–50 Kw/m$^2$ based on continuous average power per unit of effective electrode area. Advances in corona discharge power sources for ozone production provide improvements in the power utilization which can be advantageous to the present system. A suitable SCR power device is described in U.S. Pat. No. 3,784,838; however, other electrical systems may be employed to obtain power density adequate for a high gas throughput system. Overall electrical efficiency is usually expressed as the amount of power consumed per weight unit of ozone produced, and current technology can make ozone at less than 5 watt-hours per gram (W-H/$_{gm}$), while maintaining good throughput gas rate, for instance about 25 liters/m$^2$-sec.

Ozone-laden silica gel can be stripped easily by pure dry nitrogen gas or a mixture of nitrogen with inert gases at slightly below adsorption pressure, as in a moderate vacuum, employing ambient gas temperatures of 0° to 35°C. A preferred adsorption-desorption time cycle is about 5 minutes; however, cycle time is a function of bed size and fluid handling equipment capabilities. A typical system for adsorption of 2% O$_3$ in 98% O$_2$ with a 5 minute cycle time uses about 5 parts adsorbent per weight part of O$_3$ per day (e.g., 5 gm of silica gel per 1 gm daily capacity).

Ozonizer units may be of conventional construction, as shown in FIG. 2, comprising a closed chamber 20 which is packed with an adsorbent bed of silica gel particles, such as Davison Type 407. In order to achieve a continuous process, multiple ozonizers piped in parallel may be employed. Any number of ozonizers may be used; however, two or three are preferred for most processes to limit capital expenditures. The gas switching may be accomplished manually or automatically to provide a cyclic system for alternating adsorbent bed service. Between generation-adsorption and desorption cycles it may be desirable to evacuate the corona chambers to remove oxygen or carrier gas to prevent contamination of the product stream or the recycle stream. Appropriate pumping equipment may be added to the flow sheet in the drawing to accomplish this, in a manner known to one skilled in the art.

Figure 3:
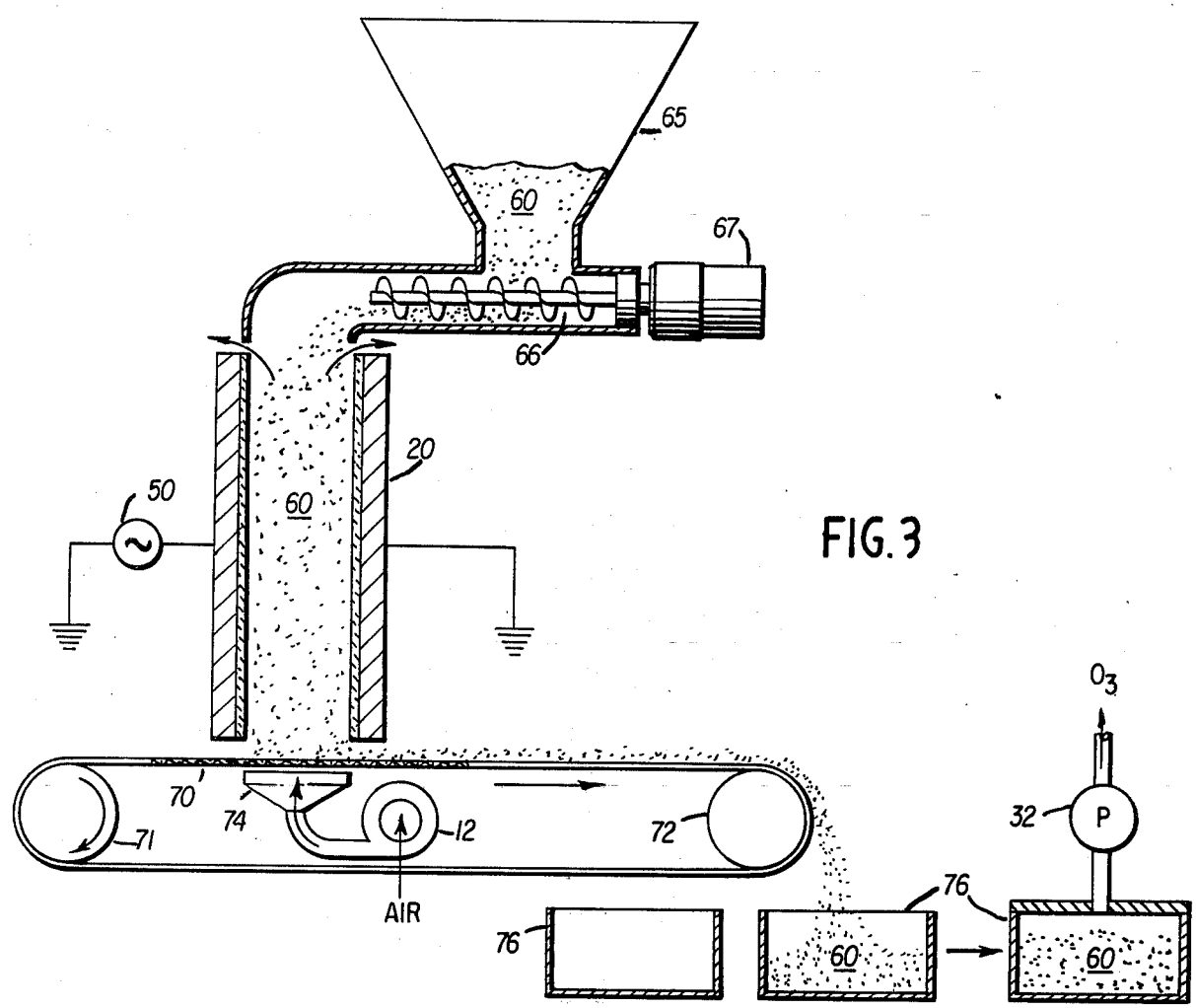
FIG. 3 is a schematic representation with vertical cross section view of an alternative embodiment employing moving adsorbent particles.

A moving adsorbent bed may be used, as shown in FIG. 3, wherein an oxygen-containing gas such as dry air is compressed by pump 12 and passed upwardly through vertical ozone generator 20. Adsorbent particles 60 fall through the corona chamber. These solid particles are fed from storage bin 65 by motor-driven feed screw 66, 67 and are collected on screen conveyor 70, driven by conveyor rolls 71, 72. A plenum 74 directs air upwardly through the foraminous belt 70. Ozone-laden particles are discharged from belt 70 into cars 76, and may be regenerated by applying a vacuum or carrier gas in a known manner.

Figure 4:
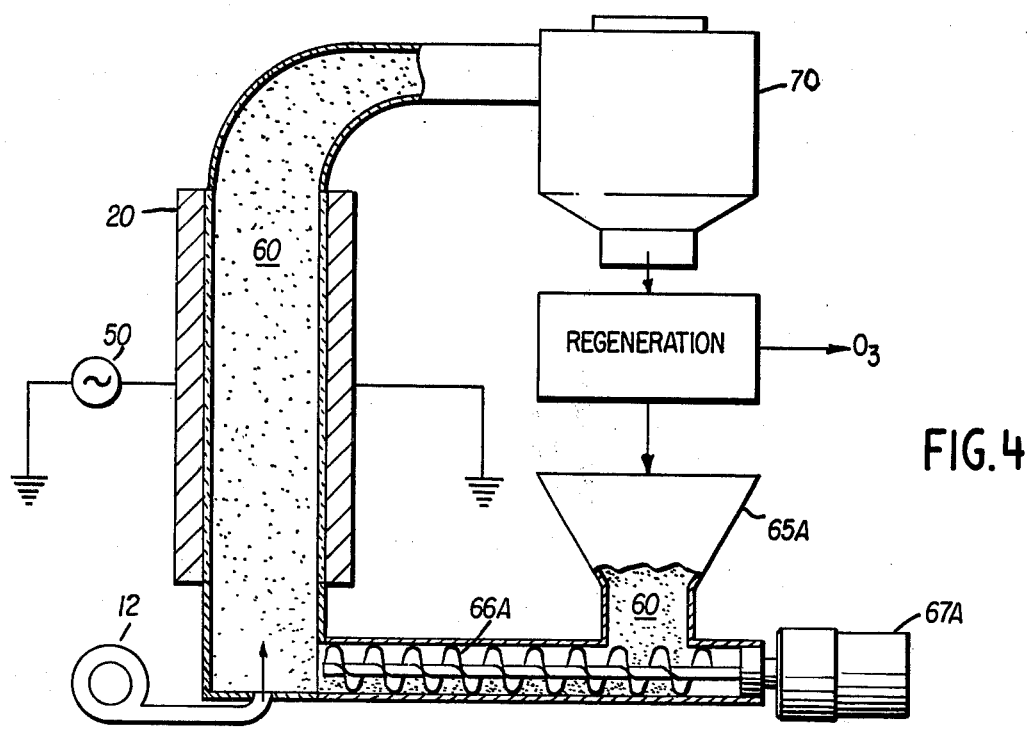
FIG. 4 is a further modification showing a fluidized bed ozonizer in vertical section, with peripheral equipment.

In the ozone generator shown in FIG. 4 supply means is provided for adding silica gel particles to the feedgas and means for fluidizing the silica gel particles with the feedgas in the corona chamber. This is accomplished by feeding adsorbent particles 60 from hopper 65A through feedscrew device 66A driven by motor 67A. This embodiment also includes means for separating ozone-laden silica gel particles from the feedgas employing cyclone separator 70 and means for regenerating the silica gel to recover adsorbed ozone. bed fluidization may also be effected in apparatus similar to that disclosed in U.S. Pat. No. 3,734,846.

The adsorbent bed saturation is a function of ozone partial pressure and the equilibrium conditions may be used advantageously between the adsorption and desorption steps. Ozone separation from an oxygen stream on a continuous basis has been described in detail in U.S. Pat. No. 2,872,397, incorporated herein by reference. The silica gel bed size depends on a number of factors; adsorption temperature, ozone partial pressure, cycle time, etc. The weight of adsorbent is usually more than 5 times the daily weight production of ozone, and may be 20 to more than 1000 times depending upon design criteria.

The adsorbent used for separating ozone from the generator exit gas stream should have several properties including a high ozone selectivity and relatively low adsorption for oxygen or nitrogen. The adsorbent may be periodically reactivated to remove minor process components or impurities, such as water. Solid particulate materials having an average particle size of 1 to 1000 $\mu$ are preferred from the standpoint of equipment design and ease of process fluid handling. The preferred adsorbents have a large ozone sorption capacity under moderate operating conditions and are easily stripped or desorbed by nitrogen-rich gas under ambient temperature/pressure conditions. While various crystalline alumino-silicates may have limited utility as a selective ozone adsorbent, prior art attempts have been most successful in the use of silica gel. Articles by Cook et al and Balcar et al in "Advances in Chemistry Series No. 21", American Chem. Soc. 1959, describe various systems for ozone sorption and transfer to a carrier gas.

The preferred adsorbent for use in the present system is Davison 407 silica gel (8-20 mesh size, U.S. Sieve). Adsorption characteristics are given in the article by Cook et al, supra.

While the system has been shown by particular example in the description and drawing, there is no intent to limit the inventive concept except as set forth in the following claims.

What is claimed is:

1. An ozone generator comprising a plurality of spaced-apart metallic electrodes and at least one thin dielectric layer between the electrodes thereby defining a corona chamber;

electrical means for imposing a silent discharge potential in the corona chamber;

supply means for passing an oxygen-containing gas through the corona chamber;

a bed of silica gel adsorbent and means for maintaining said bed of silica gel adsorbent particles in the corona chamber for adsorbing ozone generated therein; and means for desorbing the ozone from the silica gel.

2. An ozone generator according to claim 1 further comprising means for confining the gas stream in the corona chamber and ports for inlet and outlet of the gas stream.

3. In an ozone generator according to claim 1, said supply means further comprising means for adding silica gel particles to the gas and means for fluidizing the silica gel particles with the gas in the corona chamber.

4. In an ozone generator according to claim 3, means for separating ozone-laden silica gel particles from the gas and means for regenerating the silica gel to recover adsorbed ozone.

5. An ozone generator according to claim 1, further comprising means for containing the silica gel as a static bed in the corona chamber.

6. In an ozone generator having at least one dielectric layer between spaced-apart electrodes and having a corona chamber, the improvement which comprises: dielectric solid adsorbent particles disposed in the corona chamber for selectively adsorbing ozone.

* * * * *